(12) United States Patent
McColl et al.

(10) Patent No.: US 12,711,772 B2
(45) Date of Patent: Aug. 18, 2026

(54) SYSTEMS AND METHODS FOR TRAFFIC MONITORING USING MONOCULAR DEPTH ESTIMATION

(71) Applicant: Toyota Research Institute, Inc., Los Altos, CA (US)

(72) Inventors: Erin A McColl, Los Gatos, CA (US); Adrien David Gaidon, San Jose, CA (US); Vitor Campagnolo Guizilini, Santa Clara, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 236 days.

(21) Appl. No.: 18/425,550

(22) Filed: Jan. 29, 2024

(65) Prior Publication Data

US 2025/0246000 A1 Jul. 31, 2025

(51) Int. Cl.
*G06V 20/54* (2022.01)
*G06T 7/246* (2017.01)
(Continued)

(52) U.S. Cl.
CPC .............. *G06V 20/54* (2022.01); *G06T 7/246* (2017.01); *G06T 7/50* (2017.01); *G06T 7/73* (2017.01);
(Continued)

(58) Field of Classification Search
CPC .... G06V 20/54; G06V 10/82; G06V 2201/08; G06T 7/246; G06T 7/50; G06T 7/73; G06T 2207/10028; G06T 2207/20081; G06T 2207/20084; G06T 2207/30232; G06T 2207/30236; G06T 2207/30242; G08G 1/04
(Continued)

(56) References Cited

U.S. PATENT DOCUMENTS 9,043,069 B1 * 5/2015 Ferguson ................ G06T 7/215 701/23
10,861,176 B2 * 12/2020 Tong ..................... G01S 13/931
(Continued)

FOREIGN PATENT DOCUMENTS

WO 2022201212 A1 9/2022

OTHER PUBLICATIONS

Peluso et al., "Monocular Depth Perception on Microcontrollers for Edge Applications," IEEE Transactions on Circuits and Systems for Video Technology 32, No. 3, 2021, pp. 1524-1536.
(Continued)

*Primary Examiner* — Chineyere Wills-Burns
*Assistant Examiner* — Lucius Cameron Gree Allen
(74) *Attorney, Agent, or Firm* — Christopher G. Darrow; Darrow Mustafa PC

(57) ABSTRACT

Disclosed herein are systems and methods for traffic monitoring using monocular depth estimation. In one example, a system includes a processor and a memory having instructions that, when executed by the processor, cause the processor to generate a point cloud of a scene using a pre-trained monocular depth estimation network that receives an image of the scene as an input and generate traffic information of traffic at the scene using an output head that receives the point cloud and generates the traffic information.

17 Claims, 5 Drawing Sheets

(51) Int. Cl.

| | |
|---|---|
| ***G06T 7/50*** | (2017.01) |
| ***G06T 7/73*** | (2017.01) |
| ***G06V 10/82*** | (2022.01) |
| ***G08G 1/04*** | (2006.01) |

(52) U.S. Cl.
CPC ............... *G06V 10/82* (2022.01); *G08G 1/04* (2013.01); *G06T 2207/10028* (2013.01); *G06T 2207/20081* (2013.01); *G06T 2207/20084* (2013.01); *G06T 2207/30232* (2013.01); *G06T 2207/30236* (2013.01); *G06T 2207/30242* (2013.01); *G06V 2201/08* (2022.01)

(58) Field of Classification Search
USPC .......................................................... 382/103
See application file for complete search history.

(56) References Cited

U.S. PATENT DOCUMENTS

| | | | | |
|---|---|---|---|---|
| 10,936,908 | B1 * | 3/2021 | Ho | G06V 10/26 |
| 11,170,299 | B2 * | 11/2021 | Kwon | G06N 3/08 |
| 11,189,049 | B1 * | 11/2021 | Chakravarty | G06T 7/70 |
| 2017/0186165 | A1 * | 6/2017 | Taylor | G06T 7/75 |
| 2021/0122364 | A1 * | 4/2021 | Lee | G06F 18/214 |
| 2021/0201370 | A1 * | 7/2021 | Stagni | G08G 1/0116 |
| 2022/0222951 | A1 * | 7/2022 | Ye | G06V 20/64 |
| 2022/0301202 | A1 * | 9/2022 | Park | G06T 7/50 |
| 2022/0319054 | A1 * | 10/2022 | Abdo | G06N 3/0464 |
| 2022/0343521 | A1 * | 10/2022 | Wofk | G06T 7/50 |
| 2022/0357441 | A1 * | 11/2022 | Ansari | G01S 13/867 |
| 2023/0035454 | A1 * | 2/2023 | Maurer | G06T 7/20 |

OTHER PUBLICATIONS

Zheng, Ou, “Development, Validation, and Integration of AI-Driven Computer Vision System and Digital-twin System for Traffic Safety Dignostics,” 2023, 172 pages.

* cited by examiner

SYSTEMS AND METHODS FOR TRAFFIC MONITORING USING MONOCULAR DEPTH ESTIMATION

TECHNICAL FIELD

The subject matter described herein relates, in general, to systems and methods for traffic monitoring and, more specifically, traffic monitoring using monocular depth estimation.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Vehicle traffic, especially in areas with greater population density, can be an issue that can significantly impact the amount of time it takes for a vehicle to travel from one location to another. Knowledge regarding the location of vehicle traffic can be useful in determining more timely routes for vehicles to utilize. As such, a number of different technologies have been developed to determine the presence of traffic. For example, inductive loop detectors utilize coils that are embedded in a roadway that detect the presence of vehicles by changes in inductance once a metal object, like a vehicle, passes over them. In another example, cameras installed at intersections or along roadways can analyze video feed using computer vision algorithms to count vehicles, detect traffic flow, and identify patterns.

SUMMARY

This section generally summarizes the disclosure and is not a comprehensive explanation of its full scope or all its features.

In one embodiment, a system includes a processor and a memory having instructions that, when executed by the processor, cause the processor to generate a point cloud of a scene using a pre-trained monocular depth estimation network that receives an image of the scene as an input and generate traffic information of traffic at the scene using an output head that receives the point cloud and generates the traffic information.

In another embodiment, a method includes the steps of generating a point cloud of a scene using a pre-trained monocular depth estimation network that receives an image of the scene as an input and generating traffic information of traffic at the scene using an output head that receives the point cloud and generates the traffic information.

In yet another embodiment, a non-transitory computer-readable medium includes instructions that, when executed by a processor, cause the processor to generate a point cloud of a scene using a pre-trained monocular depth estimation network that receives an image of the scene as an input and generate traffic information of traffic at the scene using an output head that receives the point cloud and generates the traffic information.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described herein are systems and methods for performing traffic monitoring using monocular depth estimation. Moreover, in one example, monocular images captured from a camera are converted into depth maps utilizing a pre-trained monocular depth estimation network. The depth maps may be converted into a point cloud by back-projecting the depth maps into a three-dimensional (3D) space. An output head can then generate traffic information of traffic shown in the image captured by the camera. Generally, the output head is trained separately from the pre-trained monocular depth estimation network. Unlike the prior art systems and methods that only analyze the image using computer image algorithms, the system and method described herein can instead analyze point clouds generated from depth maps, which can result in much greater details regarding traffic within the scene captured in the image.

Figure 1:
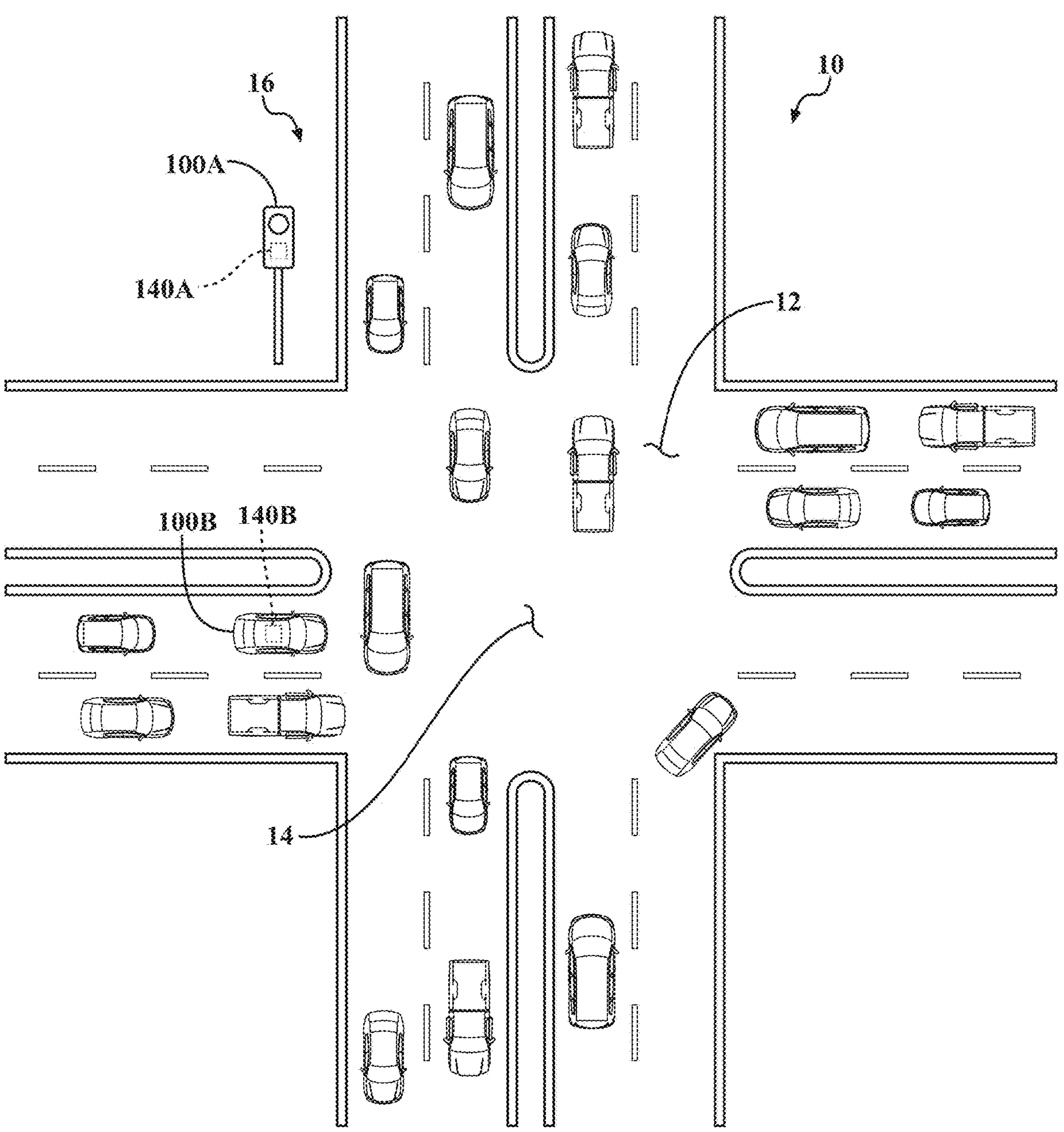
FIG. 1 illustrates one example of a scenario that utilizes a traffic monitoring system that performs traffic monitoring by utilizing monocular depth estimation.

Referring to FIG. 1, an example scenario 10 that may benefit from the utilization of the traffic monitoring systems and methods described herein. Moreover, the example scenario 10 involves a road network 12 that may include multiple roads. In this example, the road network 12 includes an intersection 14. Generally, the road network 12, in this example, includes a significant amount of traffic 16 in the form of multiple vehicles. It should be understood that the road network 12 is merely an example and may take any one of a number of different forms. For example, instead of being an intersection, the road network 12 may be a straight section of one or more roads, freeway on/off ramps, rural roads, and the like.

The type of vehicles forming the traffic 16 can also vary. In this example, the traffic 16 is made up of multiple automobiles. However, the traffic 16 can be made up of different types of modes of transportation, such as large trucks, motorcycles, bicyclists, scooters, and the like. Further still, the traffic 16 can also include pedestrians, animals, or any object that can move from one location to another. As such, the traffic 16 at the intersection 14 is generally transient in nature and may be greater at certain times and less at other times.

Also illustrated in the example scenario 10 are different forms of traffic monitoring systems 140A and 140B. As will be explained in greater detail later in this description, the traffic monitoring systems 140A and 140B can take a number of different forms and implementations. For example, the traffic monitoring system 140A is implemented within a static traffic monitoring station 100A that may be located in a fixed location near the intersection 14 so as to be able to monitor and capture images of the traffic 16 at or near the intersection 14. However, in another example, the traffic monitoring system 140B may be located in a moving object, such as a device 100B that may be separate from or form part of the traffic 16. Other implementations may also be considered. For example, the traffic monitoring system 140A and/or 140B can be implemented in other types of objects, such as buildings, roadways, road structures, aerial drones, and the like. Again, it should be understood that the implementations of the traffic monitoring systems and related methods described in this description should not be limited to just examples given and can vary considerably based on application needs.

Figure 2A:
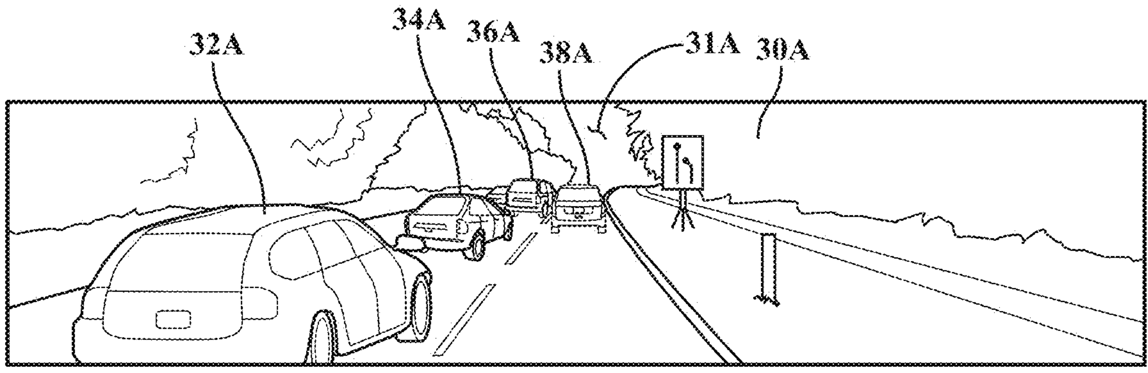
FIGS. 2A-2C illustrate an image captured by a traffic monitoring system, a depth map estimated by the traffic monitoring system, and a point cloud generated by the traffic monitoring system utilizing the depth map, respectively.

As mentioned briefly before, the traffic monitoring systems and methods described herein utilize images captured from cameras that are used as an input to a trained monocular depth estimation network that generates a depth map, which is then used to generate a point cloud of the scene shown in the image captured by the camera. To better visualize this process, reference is made to FIGS. 2A-2C. FIG. 2A shows an image 30A captured from a camera. It should be understood that the image 30A is a monocular image and is generally not paired with another image, such as done with stereoscopic camera systems. As such, the image 30A can be captured utilizing fairly inexpensive cameras that capture monocular images.

In the image 30A of a scene 31A, several objects are shown. For example, several vehicles are shown, including vehicles 32A-38A, with vehicle 32A being the closest vehicle to the camera that captured the image 30A and vehicle 38A being the furthest vehicle to the camera that captured the image 30A. Generally, the vehicles 34A and 36A are located at a distance that is between that of the vehicle 32A (the closest vehicle) and the vehicle 38A (the farthest vehicle).

Figure 2B:
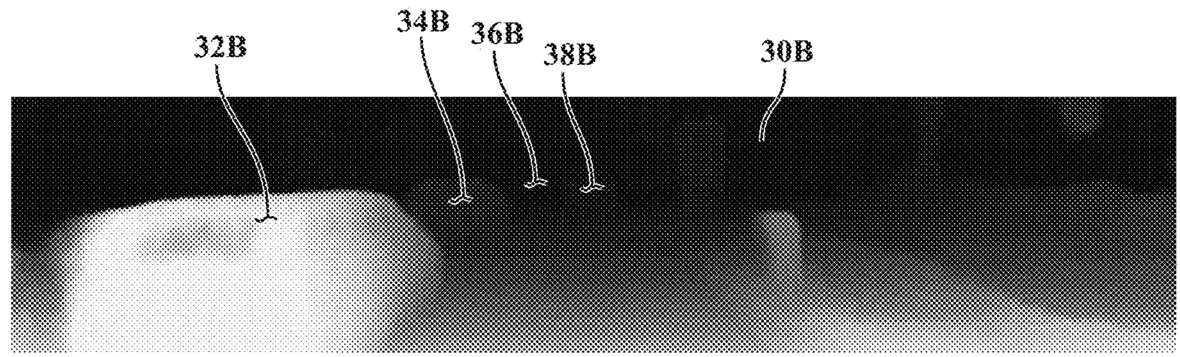

As mentioned before, the image 30A will be provided as an input to a trained monocular depth estimation network, which can generate a depth map 30B, best shown in FIG. 2B. Depth maps, such as the depth map 30B, are an image or image channel that contains information relating to the distance of surfaces or scene objects from a particular viewpoint. In this example, the particular viewpoint is the viewpoint of the camera that captured the image 30A. Each of the pixels that form the depth map 30B generally includes information regarding the distance of the surfaces of the objects, in this case, the vehicles 32A-38A. As such, pixels representing surfaces that are generally closer to the viewpoint of the camera that captured the image 30A may be shown in a lighter color, while pixels representing surfaces that are farther away may be shown in a darker color. As such, the pixels 32B, representing the distance to the vehicle 32A may be lighter in color than the pixels 34B, 36B, and 38B, illustrating the distance to the vehicles 34A, 36A, and 38A, respectively.

Figure 2C:
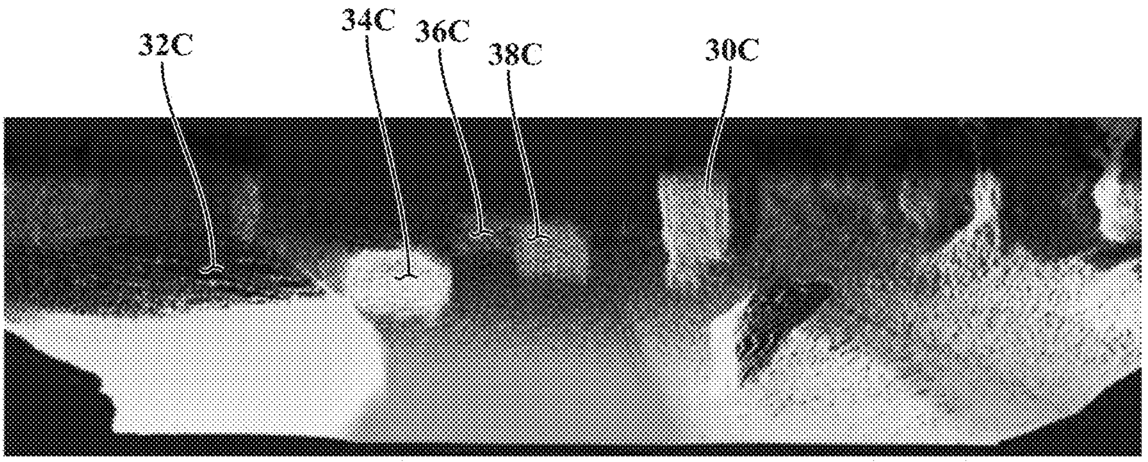

Referring to FIG. 2C, once the depth map 30B is generated, the depth map 30B can be back-projected into a 3D space to generate a point cloud 30C of the scene 31A representative in the image 30A. In this example, the point cloud 30C includes a set of data points in a 3D coordinate system. Each point of the point cloud 30C represents a single spatial measurement on the object's surface. As such, the points 32C, 34C, 36C, and 38C represent the points making up the surfaces of the vehicle 32A, 34A, 36A, and 38A, respectively. It should be understood that the points of the point cloud 30C may also include other information beyond just spatial information. For example, the points 32C, 34C, 36C, and 38C may also include information regarding which particular object the points 32C, 34C, 36C, and 38C are associated with, object type, velocity, direction, distance to a particular viewpoint, such as the camera captured the image 30A, and the like. This additional information is generated by utilizing an output head, as will be described later in this description.

Figure 3:
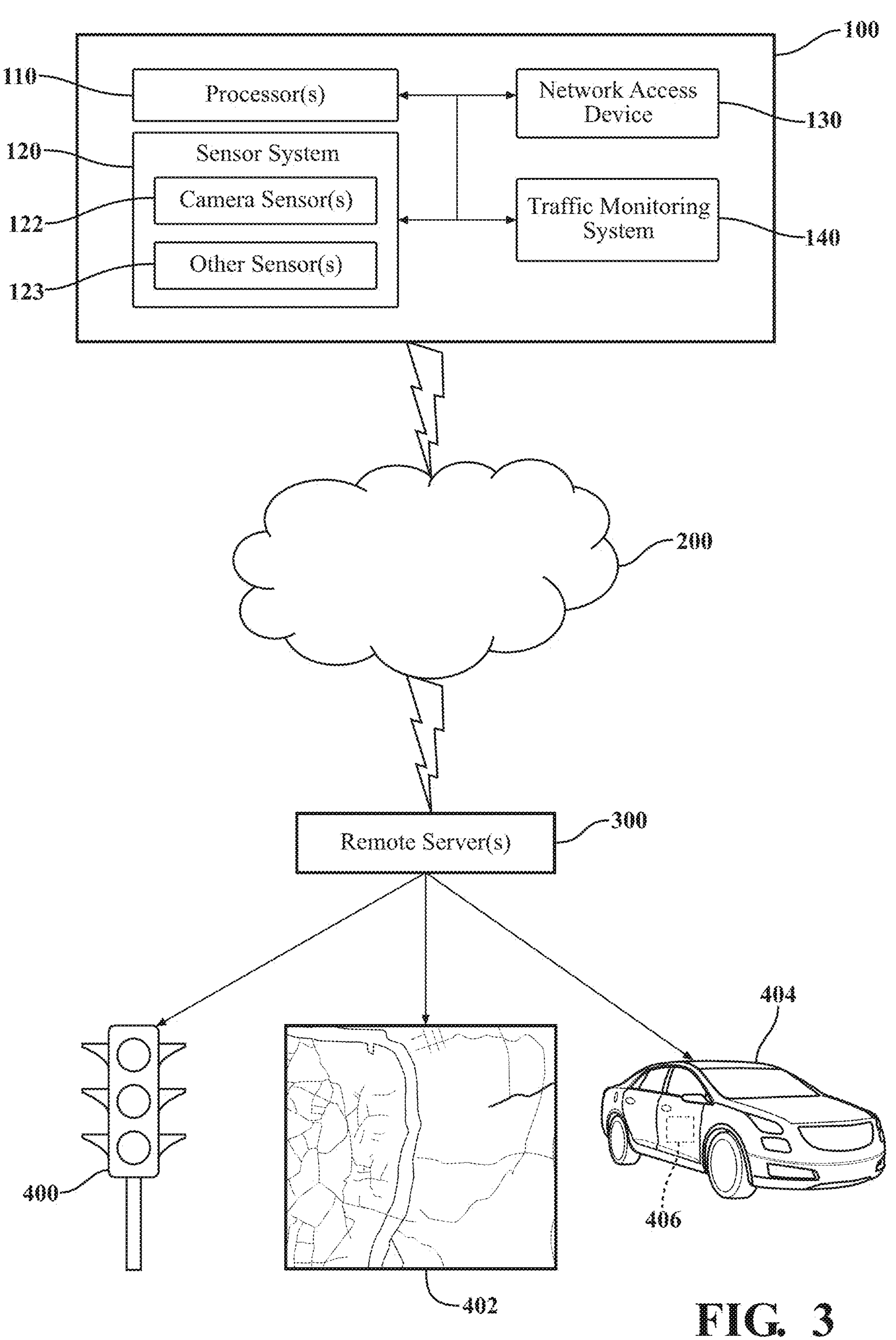
FIG. 3 illustrates one example of the implementation of a traffic monitoring system.

Turning attention to the type of devices that may include the traffic monitoring system or execute the methods associated with the traffic monitoring system, such as the static traffic monitoring station 100A and/or the device 100B, reference is made to FIG. 3. Here, illustrated is one example of a device 100 that may incorporate the traffic monitoring system 140. The device 100 can be similar to the other devices, such as the static traffic monitoring station 100A and/or the device 100B. However, it should be understood that the device 100 can take any one of a number of different forms and should not be limited to just examples given in this description.

The device 100 also includes various elements. It will be understood that in various embodiments, it may not be necessary for the device 100 to have all of the elements shown in FIG. 3. The device 100 can have any combination of the various elements shown in FIG. 3. Further, the device 100 can have additional elements to those shown in FIG. 3. In some arrangements, the device 100 may be implemented without one or more of the elements shown in FIG. 3. While the various elements are shown as being located within the device 100 in FIG. 3, it will be understood that one or more of these elements can be located external to the device 100. Further, the elements shown may be physically separated by large distances and provided as remote services (e.g., cloud-computing services).

In this example, the device 100 includes a traffic monitoring system 140. The traffic monitoring system may be incorporated within the device 100, as shown, but can also be located separately from the device 100. As such, the device 100 can function to capture images and provide them to the traffic monitoring system 140, which may be remote from the device 100.

The device 100 may also include a sensor system 120 that may include one or more camera sensor(s) 122 and other sensors 123. Generally, the camera sensor(s) 122 may be able to capture monocular images, like the image 30A shown in FIG. 2A. The other sensors 123 may be optional, but it may be advantageous in certain applications to include sensors such as radar sensors, sonar sensors, LIDAR sensors, humidity/temperature sensors, and the like.

The device 100 may also include a network access device 130 that allows the device 100 to communicate with remote devices via a network, such as the network 200 is illustrated. As such, the network 200 may be a distributed network, such as the Internet.

The remote devices may be one or more remote server(s) 300 that can control other systems and subsystems utilizing traffic information generated by the traffic monitoring system 140. For example, the remote server(s) 300 may be able to adjust traffic management systems 400 to minimize traffic congestion at a particular location based on the traffic information generated by the traffic monitoring system 140. For example, the traffic management system 400 may be able to control one or more traffic signals, such as one or more lights, to better manage the flow of traffic. Further still, the remote server(s) 300 may be able to update electronic maps 402 that illustrate where traffic congestion is located based on the traffic information generated by the traffic monitoring system 140.

As another example, the remote server(s) 300 can provide information to one or more vehicles 404 that may include a routing system and/or an autonomous driving system 406 that can utilize the information to control the operation of the vehicle 404 so as to minimize the impact of traffic congestion as the vehicle 404 travels from one location to another. For example, the routing system and/or the autonomous driving system 406 may calculate routes and/or control the vehicle 404 so as to avoid or minimize the usage of roadways that may have traffic congestion.

It should be understood that the actions taken by the remote server(s) 300 utilizing information generated by the traffic monitoring system 140 can vary considerably and should not be limited to just those given in this description. As such, the remote server(s) 300 can control any device that may benefit from the traffic information generated by the traffic monitoring system 140.

Figure 4:
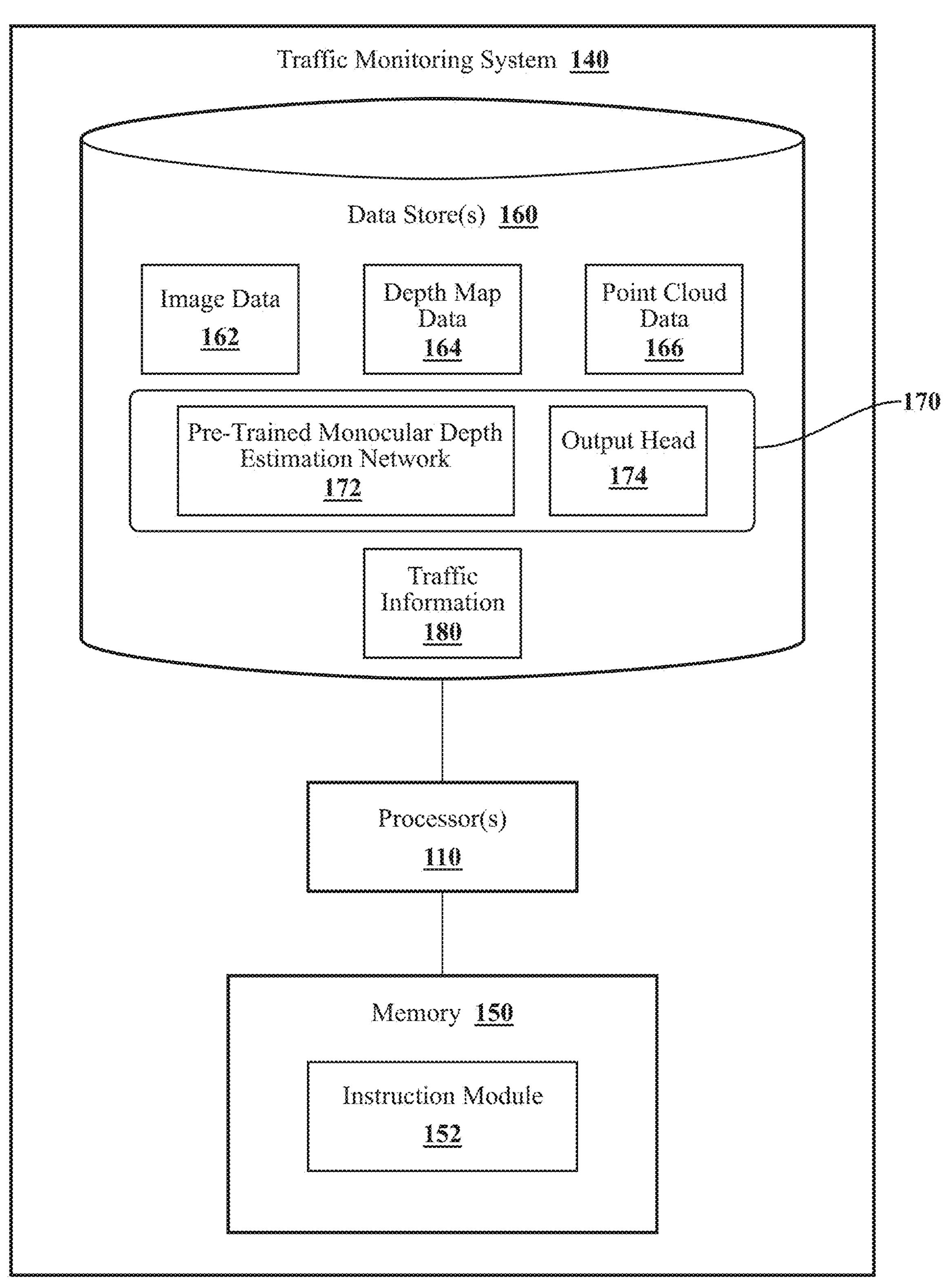
FIG. 4 illustrates a more detailed view of the traffic monitoring system of FIG. 3.

With reference to FIG. 4, one embodiment of the traffic monitoring system 140 is further illustrated. As shown, the traffic monitoring system 140 includes a processor(s) 110. Accordingly, the processor(s) 110 may be a part of the traffic monitoring system 140, or the traffic monitoring system 140 may access the processor(s) 110 through a data bus or another communication path. In one or more embodiments, the processor(s) 110 is an application-specific integrated circuit that is configured to implement functions associated with an instruction module 152. In general, the processor(s) 110 is an electronic processor, such as a microprocessor, which is capable of performing various functions as described herein. In one embodiment, the traffic monitoring system 140 includes a memory 150 that stores the instruction module 152. The memory 150 may be a random-access memory (RAM), read-only memory (ROM), a hard disk drive, a flash memory, or other suitable memory for storing the instruction module 152. The instruction module 152 is, for example, computer-readable instructions that, when executed by the processor(s) 110, cause the processor(s) 110 to perform the various functions disclosed herein.

Furthermore, in one embodiment, the traffic monitoring system 140 includes a data store(s) 160. The data store(s) 160 is, in one embodiment, an electronic data structure such as a database that is stored in the memory 150 or another memory and that is configured with routines that can be executed by the processor(s) 110 for analyzing stored data, providing stored data, organizing stored data, and so on. Thus, in one embodiment, the data store(s) 160 stores data used by the instruction module 152 in executing various functions.

In one embodiment, the data store(s) 160 includes information that is used in or generated by the processor(s) 110 when executing the instructions within the instruction module 152. In this example, the data store(s) 160 include image data 162, depth map data 164, and point cloud data 166. The image data 162 can include one or more monocular images captured by one or more cameras, such as the camera sensor(s) 122 of the device 100. The depth map data 164 can include one or more depth maps generated by the pre-trained monocular depth estimation network 172. The point cloud data 166 can be one or more point clouds generated by back-projecting the depth maps of the depth map data 164.

The traffic information 180 is generated by the output head 174, which may be able to disseminate traffic-related information, such as static information or dynamic information. Static information and/or dynamic information can include information regarding traffic and a scene from one or more captured images of the image data 162 utilizing the point cloud data 166. For example, static information can include identifiers of vehicles or objects within the scene of the captured image, location of vehicles and/or objects, distances of the vehicles and/or objects to a camera that generated the image, and distances between vehicles and/or objects. The dynamic information can include the velocities and directions of any vehicles and/or objects.

In some cases, the traffic information 180 may include the point cloud data 166 as well as additional information regarding the points of the point cloud, previously described regarding the static and/or dynamic information. As such, points of a particular point cloud can include vehicle/object identifier, distance to the camera, velocity/heading information, and the like. These multiple point clouds that are included within the traffic information and/or the point cloud data 166 can be stored and analyzed to determine traffic patterns, traffic flow, traffic density, and the like.

As to the pre-trained monocular depth estimation network 172 and the output head 174, these two elements may be one or more neural networks 170. Moreover, the pre-trained monocular depth estimation network may utilize one or more technologies, such as an encoder-decoder architecture that may utilize convolutional neural networks as their building blocks. The encoder may include convolutional layers that gradually downsample the spatial dimensions of the input image while extracting hierarchical features. The decoder part involves a series of operations combined with convolutional layers. It takes encoded, low-resolution feature representations and gradually reconstructs them back into the original input size. These operations ultimately result in the generation of depth maps, such as the depth map 30B, of the input images from the image data 162. Once the depth maps are generated, the depth maps can be converted to point clouds by back-projecting the depth maps into a 3D space, as previously explained and shown in FIG. 2C.

The output head 174 may be separately trained from the pre-trained monocular depth estimation network 172. The output head 174 may include one or more layers that can extract features from the point clouds, eventually generating the traffic information 180. As mentioned before, traffic information 180 can include static and/or dynamic information. It may also include the point clouds themselves, wherein the points of the point clouds have been modified to include the additional static and/or dynamic information.

As to the instruction module 152, as explained previously, the instruction module 152 generally includes instructions that control the processor(s) 110 to perform any of the functions described herein. As such, the instruction module 152 may include instructions that, when executed by the processor(s) 110, cause the processor to instruct one or more cameras, such as the camera sensor(s) 122, to capture one or more images of the scene, such as the scene 31A.

Once one or more images have been captured, the instruction module 152 may cause the processor(s) 110 to generate one or more point clouds of the captured images. As explained previously, this may be accomplished by utilizing the pre-trained monocular depth estimation network 172, which can generate depth maps of the captured images. Point clouds can then be generated by back-projecting the depth maps into a 3D space.

Once the point clouds have been generated, instruction module 152 may cause the processor(s) 110 to generate traffic information 180 of traffic at the scene captured in the image using the output head 174, which essentially receives the point clouds and generates the traffic information. As mentioned before, the traffic information can include static and/or dynamic information, such as identifiers of vehicles/objects, locations of the vehicle/objects, the number of vehicle/objects, distances of the vehicle/objects to a camera that generated the image, distances between the vehicle/objects, velocities of the vehicle/objects, and directions of the vehicle/objects.

Once the traffic information 180 has been generated, the traffic information 180 may be utilized by one or more systems or subsystems that may benefit from the traffic information 180. As described previously, the systems and subsystems may include remote servers, such as the remote server(s) 300, that may control various systems and subsystems, such as traffic management systems 400, updating electronic maps 402, and/or controlling the operation of a vehicle via a routing and/or autonomous driving system 406.

The instruction module 152 can also cause the processor (s) 110 to store point clouds generated utilizing the depth maps created by the pre-trained monocular depth estimation network at different times. For example, the point clouds can be of the same scene at different moments in time. After that, the instruction module 152 can cause the processor to analyze the stored point clouds to determine one or more temporal characteristics of the objects forming points in the point clouds by comparing two or more stored point clouds. For example, temporal characteristics can include things such as the number of objects that exist at different moments in time, changing traffic densities, the type of objects present at different times, etc. These temporal characteristics can partially or completely encompass the traffic information 180. Like before, this information can be provided to other systems, such as the remote server(s) 300, which may control one or more systems and subsystems that rely on the traffic information 180 to function efficiently.

Figure 5:
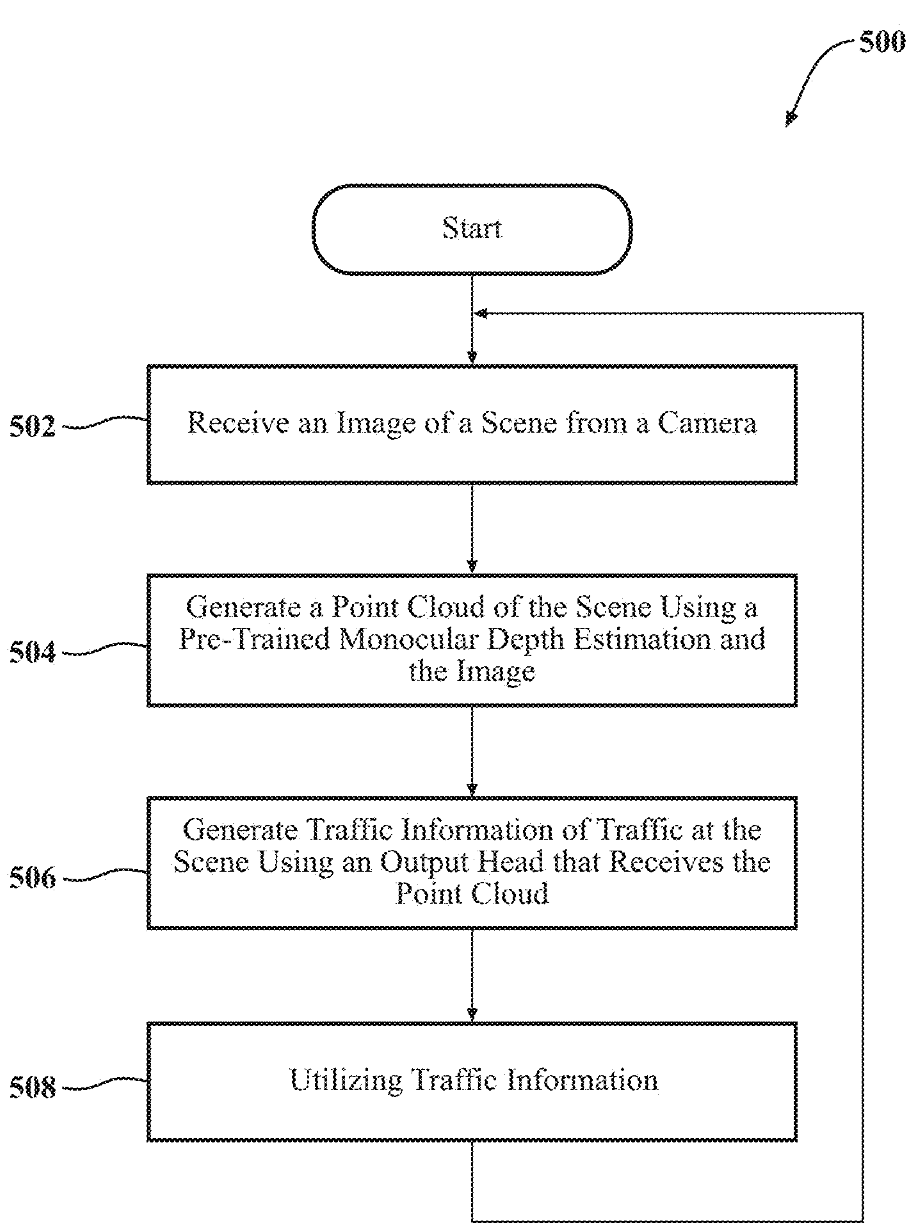
FIG. 5 illustrates a method for traffic monitoring using monocular depth estimation.

Referring to FIG. 5, a method 500 for generating traffic information is shown. The method 500 will be described from the viewpoint of the device 100 of FIG. 3 and the traffic monitoring system 140 of FIG. 4. However, it should be understood that this is just one example of implementing the method 500. While method 500 is discussed in combination with the traffic monitoring system 140, it should be appreciated that the method 500 is not limited to being implemented within the traffic monitoring system 140, but is instead one example of a system that may implement the method 500.

In step 502, the instruction module 152 may cause the processor(s) 110 to instruct one or more cameras, such as the camera sensor(s) 122, to capture one or more images of the scene, such as the scene 31A.

In step 504, the instruction module 152 may cause the processor(s) 110 to generate one or more point clouds of the captured images. As explained previously, this may be accomplished by utilizing the pre-trained monocular depth estimation network 172, which can generate depth maps of the captured images. Point clouds can then be generated by back-projecting the depth maps into a 3D space.

In step 506, the instruction module 152 may cause the processor(s) 110 to generate traffic information 180 of traffic at the scene captured in the image using the output head 174, which essentially receives the point clouds and generates the traffic information. As mentioned before, the traffic information can include static and/or dynamic information, such as identifiers of vehicles/objects, locations of the vehicle/objects, the number of vehicle/objects, distances of the vehicle/objects to a camera that generated the image, distances between the vehicle/objects, velocities of the vehicle/objects, and directions of the vehicle/objects.

In step 508, the instruction module 152 may cause the processor(s) 110 to utilize the traffic information 180. In some cases, the processor(s) 110 may utilize the traffic information 180 to control, either directly or indirectly, one or more systems or subsystems that may benefit from the traffic information 180. As mentioned before, the systems and subsystems can include traffic management systems 400, updating electronic maps 402, and/or controlling the operation of a vehicle via a routing and/or autonomous driving system 406. After that, the method 500 may return to step 502 or may end altogether.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor; and a memory in communication with the processor, the memory having instructions that, when executed by the processor, cause the processor to:

generate a depth map of a scene using a pre-trained monocular depth estimation network that receives an image of the scene as an input;

generate a point cloud of the scene by back-projecting the depth map into a three-dimensional space; and generate traffic information of traffic at the scene using an output head that receives the point cloud and generates the traffic information, wherein the traffic information includes the point cloud and points of the point cloud are modified by the output head to include, for each point, an identifier associated with an object, a velocity and direction of the object, and a distance between the object and at least one other object.

2. The system of claim 1, wherein the output head is trained separately from the pre-trained monocular depth estimation network.

3. The system of claim 1, wherein the traffic information includes static information and dynamic information of vehicles forming the traffic at the scene.

4. The system of claim 3, wherein:

the static information includes at least one of: identifiers of the vehicles, locations of the vehicles, a number of the vehicles, distances of the vehicles to a camera that generated the image, and distances between the vehicles; and the dynamic information includes at least one of velocities of the vehicles and directions of the vehicles.

5. The system of claim 1, wherein the memory further includes instructions that, when executed by the processor, cause the processor to:

store a plurality of point clouds generated by the pre-trained monocular depth estimation network of images captured at different times; and determine one or more temporal characteristics of objects forming points of the plurality of point clouds over time by comparing at least two of the plurality points clouds.

6. The system of claim 1, wherein the memory further includes instructions that, when executed by the processor, cause the processor to capture the image using at least one camera mounted on one or more of a vehicle and a fixed location.

7. A method comprising:

generating a depth map of a scene using a pre-trained monocular depth estimation network that receives an image of the scene as an input;

generating a point cloud of the scene by back-projecting the depth map into a three-dimensional space; and generating traffic information of traffic at the scene using an output head that receives the point cloud and generates the traffic information, wherein the traffic information includes the point cloud and points of the point cloud are modified by the output head to include, for each point, an identifier associated with an object, a velocity and direction of the object, and a distance between the object and at least one other object.

8. The method of claim 7, wherein the output head is trained separately from the pre-trained monocular depth estimation network.

9. The method of claim 7, wherein the traffic information includes static information and dynamic information of vehicles forming the traffic at the scene.

10. The method of claim 9, wherein:

the static information includes at least one of: identifiers of the vehicles, locations of the vehicles, a number of the vehicles, distances of the vehicles to a camera that generated the image, and distances between the vehicles; and the dynamic information includes at least one of velocities of the vehicles and directions of the vehicles.

11. The method of claim 7, further comprising:

storing a plurality of point clouds generated by the pre-trained monocular depth estimation network of images captured at different times; and determining one or more temporal characteristics of objects forming points of the plurality of point clouds over time by comparing at least two of the plurality points clouds.

12. The method of claim 7, further comprising capturing the image of the scene using at least one camera mounted on one or more of a vehicle and a fixed location.

13. A non-transitory computer-readable medium including instructions that, when executed by a processor, cause the processor to:

generate a depth map of a scene using a pre-trained monocular depth estimation network that receives an image of the scene as an input;

generate a point cloud of the scene by back-projecting the depth map into a three-dimensional space; and generate traffic information of traffic at the scene using an output head that receives the point cloud and generates the traffic information, wherein the traffic information includes the point cloud and points of the point cloud are modified by the output head to include, for each point, an identifier associated with an object, a velocity and direction of the object, and a distance between the object and at least one other object.

14. The non-transitory computer-readable medium of claim 13, wherein the output head is trained separately from the pre-trained monocular depth estimation network.

15. The non-transitory computer-readable medium of claim 13, wherein the traffic information includes static information and dynamic information of vehicles forming the traffic at the scene.

16. The non-transitory computer-readable medium of claim 15, wherein:

the static information includes at least one of: identifiers of the vehicles, locations of the vehicles, a number of the vehicles, distances of the vehicles to a camera that generated the image, and distances between the vehicles; and the dynamic information includes at least one of velocities of the vehicles and directions of the vehicles.

17. The non-transitory computer-readable medium of claim 13, further comprising instructions that, when executed by the processor, cause the processor to:

store a plurality of point clouds generated by the pre-trained monocular depth estimation network of images captured at different times; and determine one or more temporal characteristics of objects forming points of the plurality of point clouds over time by comparing at least two of the plurality points clouds.

* * * * *